US012003138B2

(12) United States Patent
Büttner et al.

(10) Patent No.: US 12,003,138 B2
(45) Date of Patent: Jun. 4, 2024

(54) STATOR FOR A HOUSING-FREE DYNAMOELECTRIC ROTARY MACHINE

(71) Applicant: Innomotics GmbH, Nuremberg (DE)

(72) Inventors: Klaus Büttner, Hollstadt (DE); Reiner Grillenberger, Windsbach (DE); Klaus Kirchner, Ostheim (DE); Matthias Warmuth, Windshausen (DE)

(73) Assignee: Innomotics GmbH, Nuremberg (DE)

( * ) Notice: Subject to any disclaimer, the term of this patent is extended or adjusted under 35 U.S.C. 154(b) by 0 days.

(21) Appl. No.: 18/016,937

(22) PCT Filed: Apr. 1, 2021

(86) PCT No.: PCT/EP2021/058574
§ 371 (c)(1),
(2) Date: Jan. 19, 2023

(87) PCT Pub. No.: WO2022/017653
PCT Pub. Date: Jan. 27, 2022

(65) Prior Publication Data
US 2023/0275475 A1      Aug. 31, 2023

(51) Int. Cl.
*H02K 1/18* (2006.01)
*H02K 1/20* (2006.01)
*H02K 5/15* (2006.01)

(52) U.S. Cl.
CPC ............. *H02K 1/18* (2013.01); *H02K 1/20* (2013.01); *H02K 5/15* (2013.01)

(58) Field of Classification Search
CPC ............... H02K 1/18; H02K 1/20; H02K 5/15
(Continued)

(56) References Cited

U.S. PATENT DOCUMENTS 5,008,575 A * 4/1991 Ishimoto .................. H02K 5/22
310/91
2003/0098622 A1 * 5/2003 Lino ....................... H02K 1/185
310/89

(Continued)

FOREIGN PATENT DOCUMENTS

CN     103178626 A  *  6/2013  ............. H02K 3/325
CN     104734442 A  *  6/2015
(Continued)

OTHER PUBLICATIONS

PCT International Search Report and Written Opinion of International Searching Authority dated Mar. 17, 2022 corresponding to PCT International Application No. PCT/EP2021/058574 filed Apr. 1, 2021.

(Continued)

*Primary Examiner* — Jose A Gonzalez Quinones
(74) *Attorney, Agent, or Firm* — Henry M. Feiereisen LLC

(57) ABSTRACT

A housing-free dynamoelectric rotary machine includes a stator having a material layer structure which includes a plurality of material layers arranged in a row along a rotation axis. The material layer structure includes a plurality of thickenings and a plurality of slots, with the slots arranged such that each of the slots is arranged between two respective ones of the thickenings. At least one of the slots is designed to receive a slot wedge, with a respective one of the thickenings being designed to fasten the slot wedge. An end element is arranged on an axial end of the stator and includes a connection box for supply with electrical energy. A connecting element connects the end element to the stator and is connected to the slot wedge.

9 Claims, 6 Drawing Sheets

(58) Field of Classification Search
USPC .............................. 310/89, 91, 413, 418, 422
See application file for complete search history.

(56) References Cited

U.S. PATENT DOCUMENTS

2006/0284511 A1* 12/2006 Evon ................... H02K 9/14
310/58
2012/0286621 A1* 11/2012 Soga ................... H02K 1/16
310/216.008

FOREIGN PATENT DOCUMENTS

| | | |
|---|---|---|
| DE | 20 37 769 A1 | 2/1972 |
| DE | 78 13 179 U1 | 9/1978 |
| DE | 102012023811 A1 * | 6/2013 ............... H02K 5/04 |
| DE | 10 2016 000 985 A1 | 9/2016 |
| WO | WO 2017/162944 A1 | 9/2017 |

OTHER PUBLICATIONS

Agrikola Jürgen et al:"Rotierende Maschine mit einem aus einem metallischen Werkstoff gepressten Verbindungselement", Prior Art Publishing, Prior Art Publishing, Dieffenbachstrasse 33, D-10967 Berlin, Germany, Oct. 10, 2016 (Oct. 10, 2016), XP040686422.

* cited by examiner

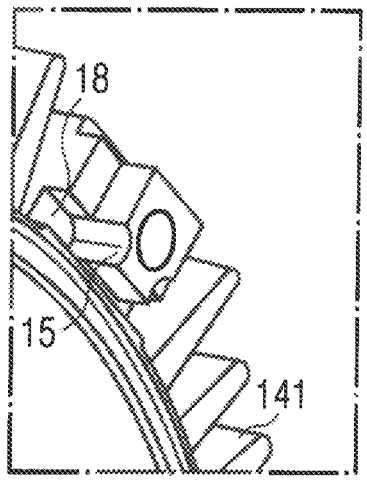
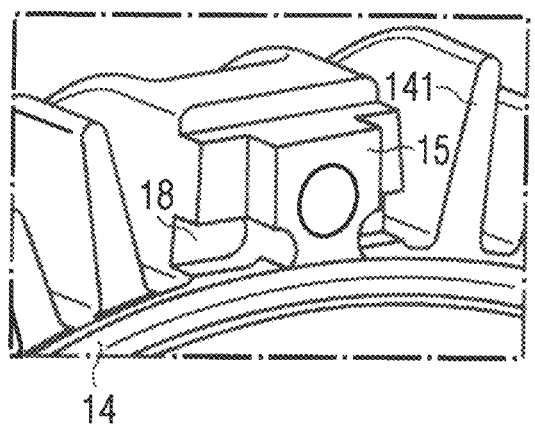
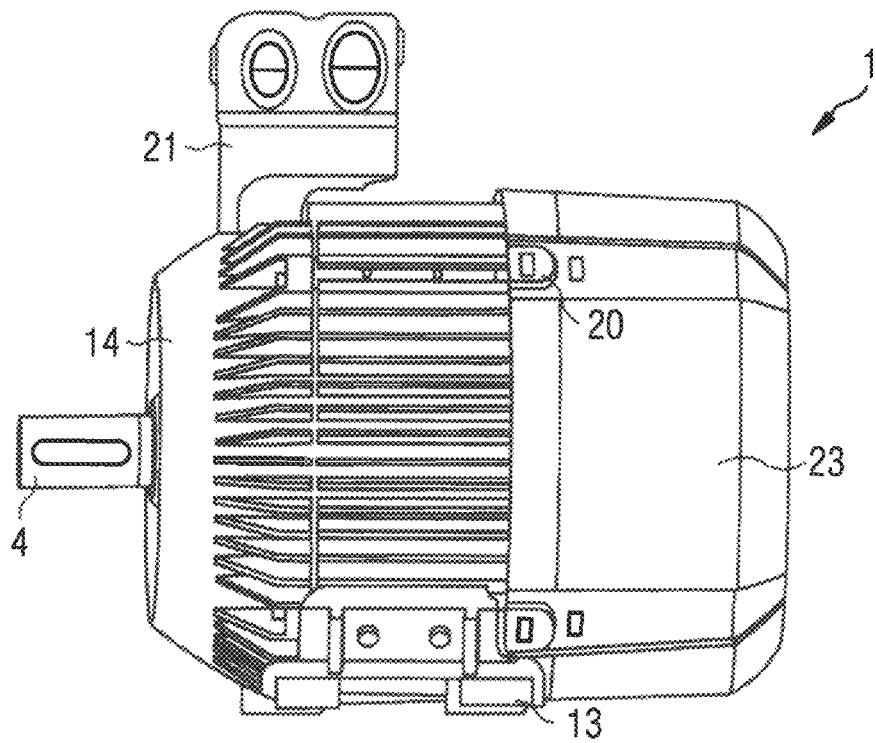

STATOR FOR A HOUSING-FREE DYNAMOELECTRIC ROTARY MACHINE

CROSS-REFERENCES TO RELATED APPLICATIONS

This application is the U.S. National Stage of International Application No. PCT/EP2021/058574, filed Apr. 1, 2021, which designated the United States and has been published as International Publication No. WO 2022/017653 A1 and which claims the priority of European Patent Application, Serial No. 20186687.8, filed Jul. 20, 2020, pursuant to 35 U.S.C. 119(a)-(d).

BACKGROUND OF THE INVENTION

The invention relates to a stator for a housing-free dynamoelectric rotary machine and a housing-free dynamoelectric rotary machine.

The patent document IDE 20 37 769 A1 discloses a surface-cooled housing-free electric motor with bearing plates that are supported on the stator core assembly which consists of rectangular laminations, wherein the stator laminations have teeth formed partially or entirely over the outer periphery such that they can be stamped gridlessly from a band material.

DE 78 13 179 U1 discloses a housing-free electric machine, preferably an electric motor with a rotor and with a laminated stator core assembly, on both end sides of which bearing plates are arranged, wherein provided on the circumference of the stator core assembly is at least one dovetail guide formed by the stator core assembly and extending parallel to the longitudinal axis of the rotor shaft of the electric machine, said dovetail guide guiding and carrying at least one element of the electric machine in a positive-locking manner, said element being secured in its operating position against axial displacement.

US 2006/284511 A1 discloses a motor comprising a stator core which is formed from a plurality of stator laminations and is at least partially a peripheral surface of the motor. Each stator lining has a plurality of ribs which extend radially outwardly. On assembly, the ribs of adjacent lamellae together form larger ribs which extend over the length of the stator core. These lamellae improve the cooling of the motor hi that they improve the heat dissipation of the motor.

A central aspect of new environmental guidelines relates to a reparability of products. Electric motors are also affected thereby.

The purposes of a housing of an electric motor includes, for example, cooling of the electric motor. However, a damaged housing is often a reason for disposing of the electric motor, since a repair is sometimes difficult.

It is an object of the invention to improve an electric motor with regard to reparability.

SUMMARY OF THE INVENTION

This object is achieved by a housing-free dynamoelectric rotary machine having a stator,
wherein the stator has a material layer structure, wherein the material layer structure has a plurality of material layers, wherein the material layers are arranged in a row along a rotation axis,
wherein the material layer structure has a plurality of thickenings and a plurality of slots, wherein a slot is arranged between two thickenings,
wherein at least one slot is formed such that at least one slot wedge can be received,
wherein at least one thickening is formed such that the slot wedge is fastenable,
wherein arranged on at least one axial end of the stator is an end element, wherein the end element is connected to the stator by means of at least one connecting element,
wherein at least one slot wedge is arranged in at least one slot of the stator,
wherein the connecting element is connected to at least one slot wedge.

The material layer structure advantageously has the function of a core assembly and is advantageously designed as a core assembly (also, stator assembly). The material layer advantageously has the function of a, preferably stamped, individual lamination and is advantageously designed as an individual lamination.

In an advantageous embodiment, the thickenings are at least partially configured as cooling ribs.

By means of this surface area enlargement, heat is conducted away by simple means.

According to the invention, at least one slot is configured such that at least one slot wedge can be received, wherein at least one thickening is formed such that the slot wedge is fastenable.

In an advantageous embodiment, for fastening the slot wedge, a first thickening has a projection on a radial end of the first thickening directed in the rotation direction, wherein a second thickening has a projection on a radial end of the second thickening directed against the rotation direction.

In an advantageous embodiment, the material layers are connected in an integrally bonded manner, in particular by means of an adhesive.

Advantageously, the individual laminations are linked to one another during a stamping process or after the stamping into a stator iron core assembly. This is achieved particularly well with full-surface gluing of the individual laminations.

Full-surface gluing additionally affords the advantage that the individual laminations are sealed against one another. In this way, a good protection against contact, foreign bodies and water is achieved.

In an advantageous embodiment, the stator is coated with a coating.

The coating advantageously ensures a corrosion protection, in particular at an outer circumference of the stator.

Furthermore, the coating is suitable for forming, in an inner region of the slots, an insulating layer between the winding and the material layer, in particular the stator lamination.

On the outer circumference, for example, a coating featuring metal is possible. The following are conceivable: a galvanic coating, a coating by thermal flame spraying or cold gas spraying and a coating with a dipping process (for example zinc coating).

Preferably, just one coating type is used which is suitable for outer regions of the stator and also for inner regions. Particularly well suited thereto is a coating on the basis of resin which is applied, for example, by painting or dipping. An electrostatic powder coating (for example with a subsequent thermal treatment) is a further possibility.

The coating preferably has a thickness of between 20 µm and 70 µm, in particular between 30 µm and 60 µm.

A coating having paint and/or resin is also conceivable. These can be unsaturated polyester-based and/or epoxide-based. Silicones are also conceivable.

The stator is protected, for example, against corrosion and therefore rust formation by the coating. This is achieved, for example, by dipping in a rust-proofing substrate and/or by painting with the rust-proofing substrate.

In addition, an electrical insulation can be generated by the coating. This takes place, for example, by means of fillers in the coating.

Advantageously herein for improvement against abrasion, preferably in the outer region, ceramic fillers are used. Ceramic fillers can also be used to increase an insulating capability and heat conduction, in particular in a slot region for the winding.

Heat-conducting particles, for example quartz sand or partial discharge-resistant particles, particularly on the basis of silicon are also suitable as fliers.

The housing-free dynamoelectric rotary machine can also be designated a single-piece stator housing unit, since a function of the housing is realized, in particular on an outer circumference of the stator.

According to the invention, a conventional housing is dispensed with. The housing is designed integrated into the stator while special contours and ribs are stamped into the individual lamination during the stamping process.

In an advantageous embodiment, an end element is arranged on a front axial end of the stator and on a rear axial end of the stator in each case.

In an advantageous embodiment, the end element is designed as a bearing plate.

The bearing plate advantageously has a receptacle for a bearing for mounting a shaft of the rotor. Advantageously, the housing-free dynamoeiectric rotary machine has a bearing plate on an Aside and a bearing plate on a B-side.

Advantageously, the end element has thickenings, in particular, configured as cooling ribs. Winding heads which are preferably positioned axially under the end element can thus better dissipate their loss heat. In this way, an efficiency level can be increased.

The cooling ribs of the stator and the cooling ribs of the end element are advantageously arranged aligned.

In an advantageous embodiment, the connecting element is a screw element. The screw element is preferably a clamping screw.

According to the invention, at least one slot wedge is arranged in at least one slot of the stator.

Advantageously, exactly one slot wedge is arranged in a slot. However, a plurality of slot wedges can be present per slot.

According to the invention, the connecting element is connected to at least one slot wedge.

Thus, an optimal bracing between the bearing plate and the stator is achieved.

In this way, the stator is connected to the end element.

Advantageously, the end element is connected to the stator at fast enable least two sites. Advantageously, this takes place by means of two slot wedges which are arranged spaced in relation to an outer circumference of the stator.

For reasons of centering, however, four sites are preferred.

In an advantageous embodiment, at least one foot is connected to at least one slot wedge.

In this way, the stator is connected to the foot. Advantageously, at least two feet are connected to the stator. Advantageously, this takes place by means of two slot wedges which are arranged spaced in relation to an outer circumference of the stator. These are advantageously situated on an underside of the stator.

However, with stators to be mounted on a wall, the feet can, for example, also be arranged laterally.

An accommodation of components such as bearing plates and feet is therefore realized with slot wedges that are introduced.

Since a position of the slot for the slot wedge is very exact due to the stamping process, a machining of the feet on the underside is not required.

In an advantageous embodiment, the end element has a connection box for supply with electrical energy.

The connection box advantageously has a socket and is designed for connection to a terminal box.

In an advantageous embodiment, the slot wedge is arranged spaced from the front axial end of the stator and/or the rear axial end of the stator.

A slot bottom surface that is free in this way enables a centering of the end elements, in particular, bearing plates, No further machining is necessary.

For this purpose, the slot is preferably designed as a keyway.

The invention offers the advantage that recycling is simplified since no housing is present, A winding can be removed from the stator assembly, for example, in the event of damage and a new winding can be introduced. A reuse of the stator assembly with the integrated housing is therefore easily possible.

The invention also offers the advantage that a machining of centerings is not necessary. Slot bottom surfaces in the stator are used for this purpose, An accuracy of a coaxial alignment is very high due to the stamping of the individual laminations.

As a result of dispensing with the housing, an annular surface of the wall on the electrically active part can also be used.

This is advantageous since the machine can be designed as short as possible with different, output-dependent core lengths within an axial height. A machine length is thus not dependent upon a housing.

The bearing plate is not fastened to a housing surface, but directly onto the material layer structure, in particular on the core assembly.

It is possible by way of the invention to enlarge an outer diameter of the stator. By way of a larger stator outer diameter, the possibility exists of designing a rotor outer diameter also to be larger and thus to achieve a higher power level and/or a greater efficiency. Optimal heat removal is also achieved. Since, however, a dimension of an axial height need not necessarily be increased, the invention permits the construction of a compact and efficient motor.

The invention is suitable for all the fields of application of dynamoelectric rotary machines, in particular for industrial uses such as pump, fan or compressor drives and for conveyor systems.

BRIEF DESCRIPTION OF THE DRAWING

The invention will now be described and explained in greater detail making reference to the examples shown in the figures, in which:

FIG. 8 shows a portion of the bearing plate, FIG. 9 shows a further portion of the bearing plate, FIG. 10 shows the dynamoelectric rotary machine with a cowl.

DETAILED DESCRIPTION OF PREFERRED EMBODIMENTS

Figure 1:
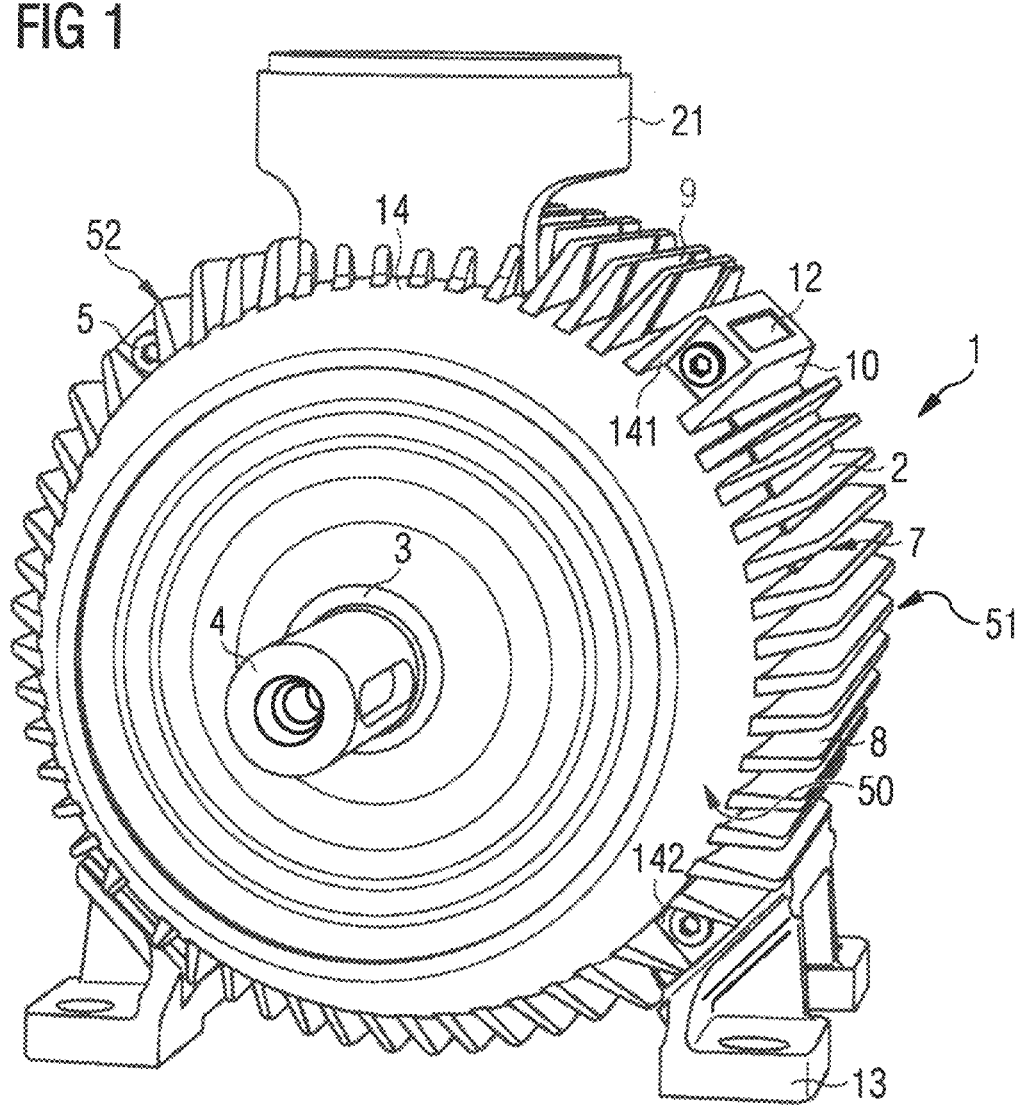
FIG. 1 shows a housing-free dynamoelectric rotary machine.

FIG. 1 shows a housing-free dynamoelectric rotary machine 1. The machine 1 comprises a stator 2, a rotor 3 and a shaft 4. The stator 2 comprises a material layer structure, in particular a core assembly 8 (also, stator assembly). Thickenings in the form of cooling ribs 9 are formed on an outer circumference 52 of the stator 2, in particular on an outer circumference of the core assembly 8. A slot 7 is formed between two cooling ribs. In addition, further thickenings in the form of a slot wedge receptacle element 10 are formed on the outer circumference. Formed lying therebetween is a slot 5.

FIG. 1 also shows a plurality of slot wedges 12 and a plurality of feet 13. Arranged on a front axial end of the stator 50 is a bearing plate 14, and preferably also a further bearing plate (not shown) is provided on a rear axial end 51.

FIG. 1 furthermore also shows that the bearing plate 14 has cooling ribs 141. The bearing plate 14 further comprises a connection box 21. The bearing plate 14 also has a slot wedge receptacle element 142, Possible fastening types for the bearing plate 14 and/or the feet 13 are described in greater detail in relation to FIGS. 5 and 6.

By enlarging the outer diameter at the stator and the rotor, it is possible to configure the machine more compactly with regard to power related to the axial height. The overall dimensions are thereby not greater than in a machine with a housing.

Recycling and conditioning of motor components are simplified by the invention.

Figure 2:
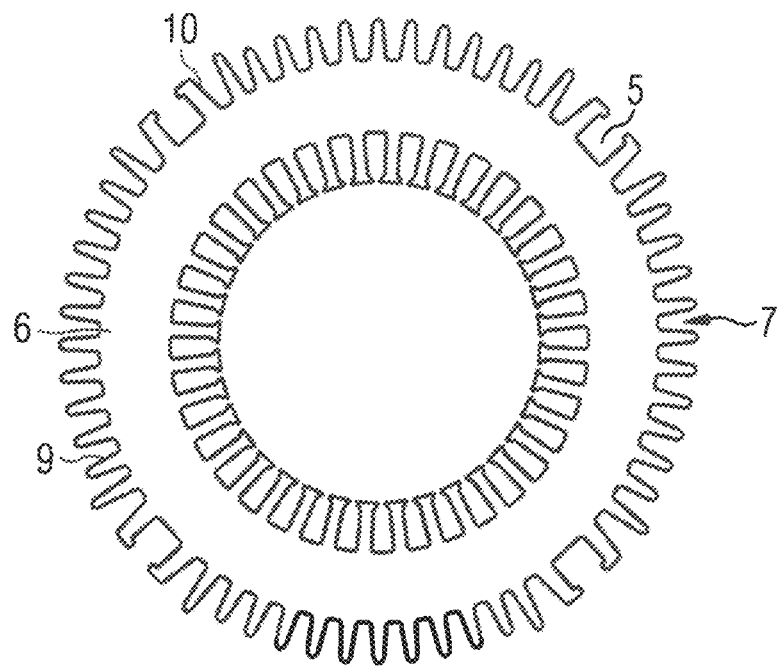
FIG. 2 shows a contour of an individual lamination.

FIG. 2 shows a contour of an individual lamination 6. The individual lamination 6 has a specific contour. The contour has indentations and protrusions on its outer circumference which serve to form cooling ribs 9 and slots 7 and other indentations and further protrusions which serve to form the slot wedge receptacle elements 10 and slots 5.

The individual lamination 6 is preferably produced, by stamping, from preferably rolled large-scale metal sheet.

Figure 3:
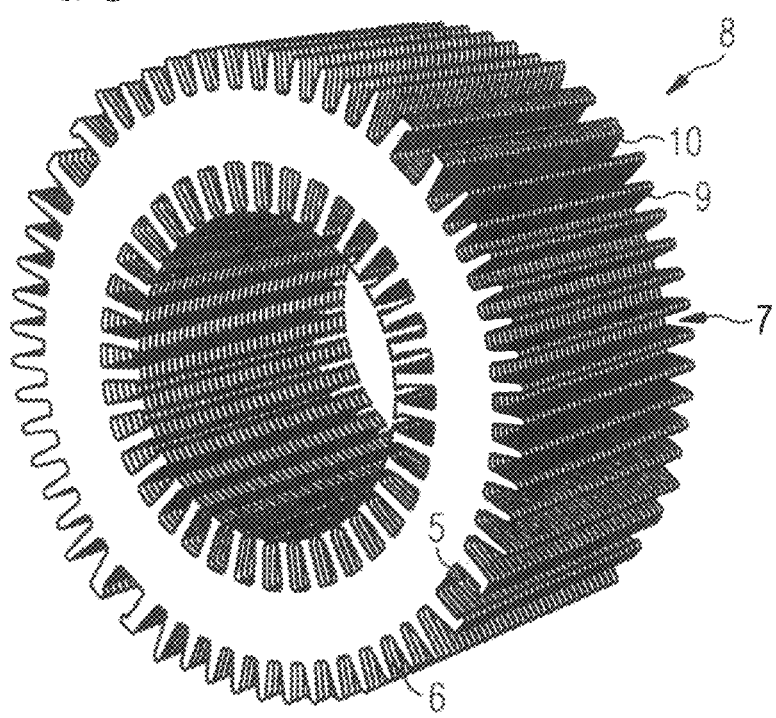
FIG. 3 shows a core assembly.

FIG. 3 shows a plurality of individual laminations 6 arranged in a row to form a core assembly 8, The individual laminations are preferably glued to one another over their whole area.

The cooling ribs 9 are advantageously produced by stamping. Cooling is therefore integrated into the stator 2. The heat transfer from the stator 2 to the cooling ribs 9 is therefore optimal.

Figure 4:
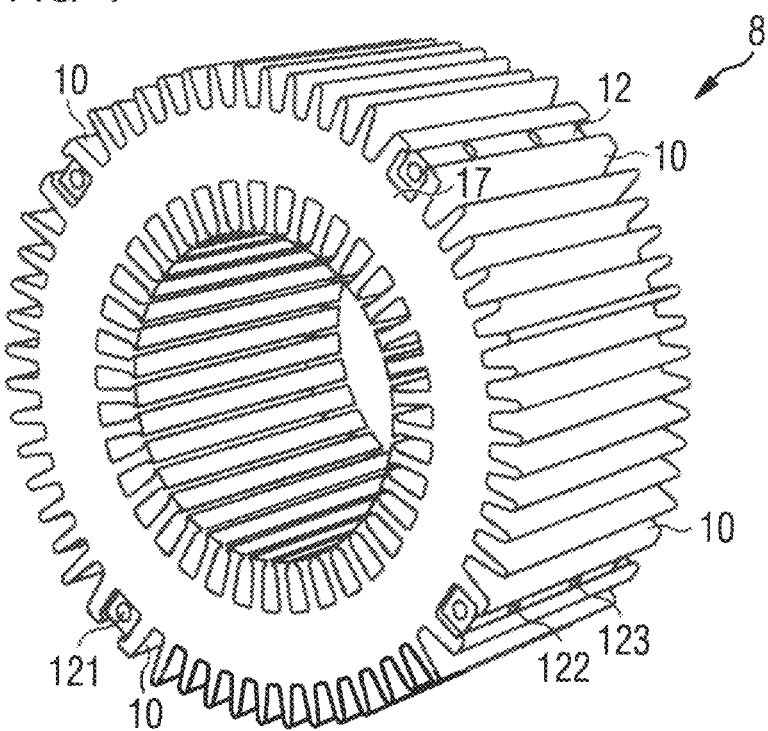
FIG. 4 shows the core assembly with four slot wedge receptacle elements.

FIG. 4 shows the core assembly 8, having four slot wedge receptacle elements 10. In FIG. 4, a slot wedge 12 is arranged in each slot wedge receptacle element 10, Advantageously, only one slot wedge 12 is provided per slot wedge receptacle element 10. It is however also possible to arrange a plurality of slot wedges 12 in a slot wedge receptacle element 10, As shown in FIG. 4, the slot wedge 12 has at least one bore 121, 122, 123 or other depressions. This serves, for example, for fastening other components. Advantageously, a bore 121 is formed on an axial end, preferably on both axial ends. FIG. 4 further shows two bores 122, 123 on the radial end of the slot wedge 12.

The slot wedge 12 is arranged spaced from the front axial end of the stator 50 (see FIG. 1) and/or from the rear axial end 51 of the stator 50. A slot bottom surface 17 that is free in this way enables a centering of the end elements, in particular, bearing plates 14. No further machining is necessary for centering.

Figure 5:
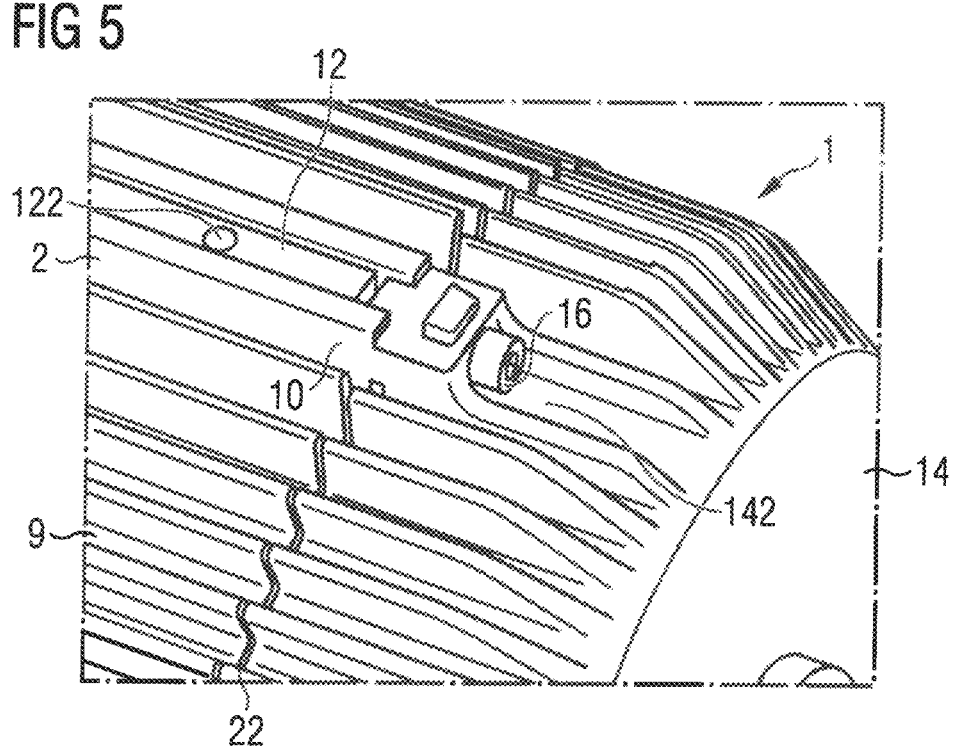
FIG. 5 shows a fastening of an end element, configured as a bearing plate, on the stator.

FIG. 5 shows a fastening of an end element, configured as a bearing plate 14, on the stator 2. A slot wedge 12 is arranged in the slot wedge receptacle element 10. A fastening 16 is arranged in the slot wedge element 142 of the bearing plate 14, This serves to fasten the bearing plate 14 on the stator 2. For example, this is a clamping screw. A fastening of the bearing plate 14 with slot wedges 12 is advantageous since the machine 1 can thus be constructed to be particularly compact.

The slot wedges 12 are advantageously designed shorter than the stator assembly 8. This makes it possible, when the bearing plates 14 are fastened, in particular by means of an axial screw fastening into the slot wedges 12, an axial clamping of the bearing plates 14 on the end sides of the stator assembly 8.

A sealing of the stator and the bearing plate is achieved particularly well with an O-ring which is introduced into a gap 22. In this way, the machine is particularly well protected against foreign bodies and being touched, and also against water. The machine 1 is therefore suitable for the protection ratings IP54 and IP55.

A foamed seal can also be introduced into the gap 22.

Figure 6:
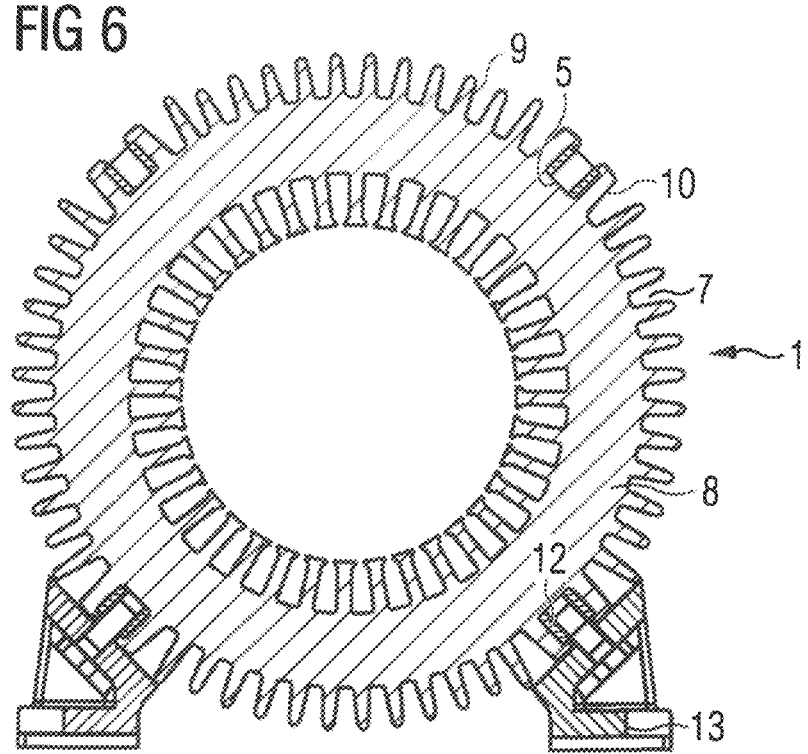
FIG. 6 shows the dynamoelectric rotary machine with feet.

FIG. 6 shows the machine 1 having feet 13. The fastening of the feet 13 is also achieved by way of the slot wedges 12. Advantageously, radial threads are created in the slot wedge 12 for fastening the foot 13 and/or for receiving a lifting eye, By way of a foot support on cooling ribs 9 and a tensioning with the slot wedge 12, the machine 1 stands securely.

A foot fastening advantageously takes place on the slot wedges 12. The feet 13 are advantageously guided in the slot 5. An embodiment with and without feet is therefore easily realized and/or retrofittable and machining is not necessary, due to the existing accuracy of the stamping process.

Figure 7:
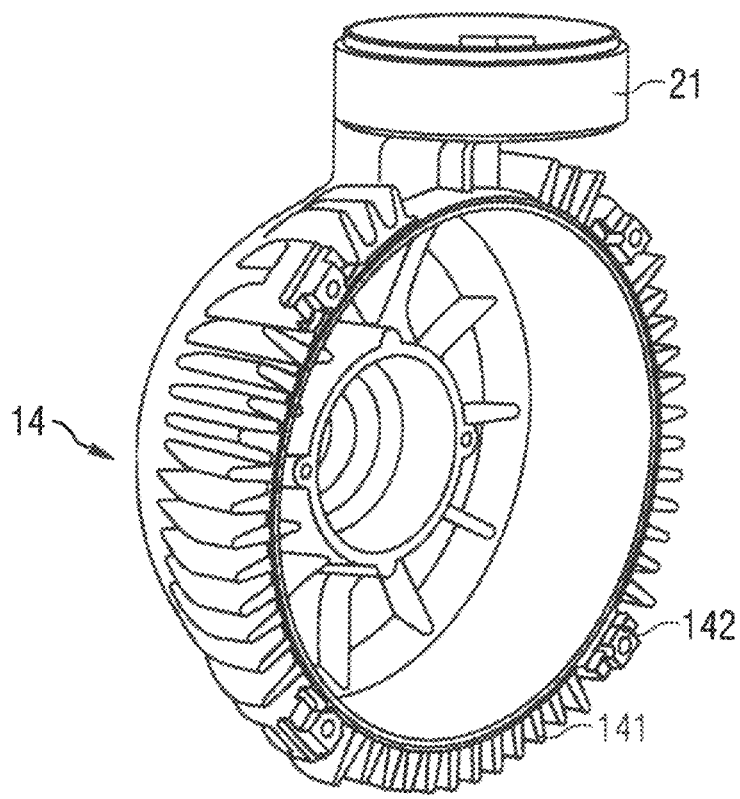
FIG. 7 shows the bearing plate.

FIG. 7 shows the bearing plate 14. The bearing plate 14 also has a plurality of cooling ribs 141 and four slot wedge receptacle elements 142. The bearing plate 14 comprises, preferably on an upper side of the bearing plate 14, a connection box socket 21. A sealing of a connection site between the bearing plate 14 and the core assembly 8 takes place, for example, by means of an O-ring which is arranged, for example, on an end side of the core assembly 8.

FIG. 8 and FIG. 9 show a portion of the bearing plate 14 and a fastening boss 15 from different perspectives. The fastening boss 15 is configured, in particular by way of a notch 18, so that a water runoff from the fastening boss 15 in the bearing plate 14 is optimal. The fastening boss 15 protrudes beyond an axial end of the bearing plate 14. On assembly of the bearing plate 14 and the stator 2, the fastening boss 15 advantageously protrudes into the slot 5 and/or engages in the slot 5. This enables centering.

FIG. 10 shows the machine 1 having a cowl 23. The machine 1 is preferably designed to be self ventilated and advantageously has a fan (not shown). The cowl 23 serves to screen the fan.

Figure 11:
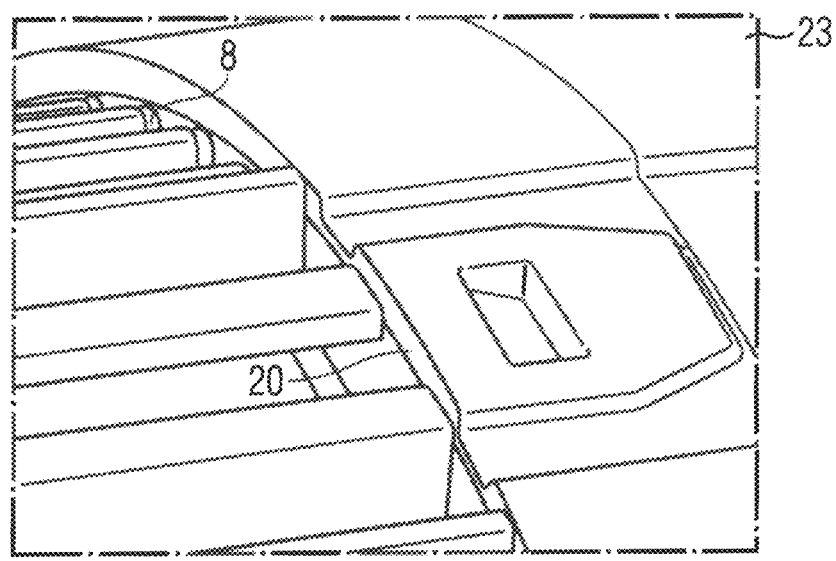
FIG. 11 shows a snap connection.

FIG. 11 shows a snap connection 20. The snap connection 20 enables a fastening of the cowl 23. Other connection types are also conceivable.

What is claimed is:

1. A housing-free dynamoelectric rotary machine, comprising:

a stator having a material layer structure which comprises a plurality of material layers arranged in a row along a rotation axis, said material layer structure comprising a plurality of thickenings and a plurality of slots, with each of the slots arranged between two opposing surfaces of the thickenings;

with at least one of the slots having a first projection disposed on a radial end of a first one of the two opposing surfaces and directed in a rotation direction, and a second projection disposed on a radial end of a second one of the two opposing surfaces and directed against the rotation direction;

a slot wedge received in the at least one slot and captively secured in the at least one slot by the first and second projection, said slot wedge further comprising an axial bore;

an end element arranged on an axial end of the stator and comprising a connection box for supply with electrical energy; and a connecting element designed to connect the end element to the axial bore of the slot wedge, wherein axial end is a front axial end or a rear axial end of the stator and the slot wedge is arranged spaced from the axial end of the stator.

2. The housing-free dynamoelectric rotary machine of claim 1, wherein the axial end is a front axial end of the stator, and further comprising a further end element arranged on a rear axial end of the stator.

3. The housing-free dynamoelectric rotary machine of claim 1, wherein the end element is designed as a bearing plate.

4. The housing-free dynamoelectric rotary machine of claim 1, wherein the connecting element is a screw element.

5. The housing-free dynamoelectric rotary machine of claim 1, further comprising a foot for support, said foot being connected to the slot wedge by way of a radial bore disposed in the slot wedge.

6. The housing-free dynamoelectric rotary machine of claim 1, wherein the thickenings are configured at least partially as cooling ribs.

7. The housing-free dynamoelectric rotary machine of claim 1, wherein the material layers are connected in an integrally bonded manner.

8. The housing-free dynamoelectric rotary machine of claim 1, wherein the stator is coated with a coating.

9. The housing-free dynamoelectric rotary machine of claim 1, wherein the material layers are connected by adhesive.

* * * * *

UNITED STATES PATENT AND TRADEMARK OFFICE
CERTIFICATE OF CORRECTION

| | | |
|---|---|---|
| PATENT NO. | : 12,003,138 B2 | Page 1 of 1 |
| APPLICATION NO. | : 18/016937 | |
| DATED | : June 4, 2024 | |
| INVENTOR(S) | : Klaus Büttner et al. | |

It is certified that error appears in the above-identified patent and that said Letters Patent is hereby corrected as shown below:

On the Title Page

After Prior Publication Data, add:
-- (30) Foreign Application Priority Data
July 20, 2020 (EP) .......................20186687 --.

On the second page, under FOREIGN PATENT DOCUMENTS:
Replace "WO 2017/162944" with -- WO 2017/152944 --.

Signed and Sealed this
Twenty-third Day of July, 2024

Katherine Kelly Vidal
*Director of the United States Patent and Trademark Office*